(12) United States Patent
Xu

(10) Patent No.: US 9,553,492 B2
(45) Date of Patent: Jan. 24, 2017

(54) PAPER SHREDDER

(76) Inventor: Ning Xu, Dong Guan (CN)

( * ) Notice: Subject to any disclaimer, the term of this patent is extended or adjusted under 35 U.S.C. 154(b) by 566 days.

(21) Appl. No.: 13/811,247

(22) PCT Filed: Sep. 26, 2011

(86) PCT No.: PCT/CN2011/080183
§ 371 (c)(1),
(2), (4) Date: Jan. 18, 2013

(87) PCT Pub. No.: WO2012/041210
PCT Pub. Date: Apr. 5, 2012

(65) Prior Publication Data
US 2013/0113310 A1  May 9, 2013

(30) Foreign Application Priority Data

Sep. 27, 2010  (CN) .................. 2010 2 0543836 U
Jul. 13, 2011  (CN) .................. 2011 2 0246575 U

(51) Int. Cl.
*H02K 9/04* (2006.01)
*B02C 18/00* (2006.01)
(Continued)

(52) U.S. Cl.
CPC .............. *H02K 9/04* (2013.01); *B02C 18/0007* (2013.01); *B02C 18/16* (2013.01); *H02K 5/20* (2013.01);
(Continued)

(58) Field of Classification Search
CPC .............. H02K 9/00; H02K 9/02; H02K 9/04; H02K 9/06; H02K 9/10; H02K 9/12; H02K 9/28; H02K 5/20; H02K 9/26; B02C 2018/0038; B02C 2018/0046
(Continued)

(56) References Cited

U.S. PATENT DOCUMENTS 4,087,707 A * 5/1978 Shinoda ................. B60K 11/06
310/63
6,478,720 B1 * 11/2002 Barker ............... A63B 22/0235
482/51

(Continued)

FOREIGN PATENT DOCUMENTS

DE         10119450 A1 * 11/2002 ............... H02K 1/20

OTHER PUBLICATIONS

Auernhammer, Machine Translation of DE10119450, Nov. 2002.*

*Primary Examiner* — Quyen Leung
*Assistant Examiner* — Eric Johnson
(74) *Attorney, Agent, or Firm* — Ming Chow; Sinorica, LLC

(57) ABSTRACT

Provided is a paper shredder comprising a housing (6) and a paper shredder head (4), wherein a transmission mechanism (5) and a motor are provided in the paper shredder head (4); the motor comprises a motor body (1), the motor body (1) having an output shaft (12) and a motor housing (11) sleeve connected on the output shaft (12); the motor housing (11) is provided with a heat dissipation device, the heat dissipation device comprising an air intake device (2) and an air output device (3); the air intake device (2) has a cold air inlet and the air output device (3) has a hot air outlet; the air intake device (2) is provided on one side of the output shaft (12) and the air output device (3) is provided on the other side of the output shaft (12); at the position where the air intake device (2) is provided on the motor housing (11) there is an air intake hole (13) opened correspondingly to communicate with an inner chamber of the motor housing (11), and at the position where the air output device (3) is provided on the motor housing (11) there is an air output hole (14) opened correspondingly to communicate with the inner chamber of the motor housing (11), such that a relatively isolated and independent heat dissipating air chan- (Continued)

nel is formed internally from the cold air inlet, via the inner chamber of the motor housing (11), to the hot air outlet.

11 Claims, 11 Drawing Sheets

(51) Int. Cl.
  *B02C 18/16* (2006.01)
  *H02K 5/20* (2006.01)
  *H02K 9/26* (2006.01)
  *H02K 7/116* (2006.01)
  *H02K 7/14* (2006.01)
(52) U.S. Cl.
  CPC .............. *H02K 7/116* (2013.01); *H02K 7/14* (2013.01); *H02K 9/26* (2013.01); *B02C 2018/0046* (2013.01)
(58) Field of Classification Search
  USPC .............................................. 310/62, 63, 58
  See application file for complete search history.

(56) References Cited

U.S. PATENT DOCUMENTS

| | | | |
|---|---|---|---|
| 6,700,235 B1 * | 3/2004 | McAfee | H02K 9/06 310/52 |
| 6,703,730 B2 * | 3/2004 | Hayashi | H02K 5/10 310/59 |
| 2002/0175573 A1 * | 11/2002 | Hayashi | H02K 5/10 310/54 |
| 2006/0054727 A1 * | 3/2006 | Ko | B02C 18/142 241/236 |
| 2006/0138261 A1 * | 6/2006 | Ho | B02C 18/0007 241/100 |
| 2008/0164355 A1 * | 7/2008 | Wang | B02C 18/0007 241/277 |
| 2008/0235899 A1 * | 10/2008 | Haan | A47L 9/122 15/320 |

* cited by examiner

PAPER SHREDDER

BACKGROUND OF INVENTION

1. Field of the Invention

The present invention relates to a motorized paper shredder. The present invention is based on Chinese Utility Model Application No. 201020543836.3, filed on Sep. 27, 2010, and Chinese Utility Model Application No. 201120246575.3, filed on Jul. 13, 2011. The contents of the above-mentioned applications are incorporated herein by reference.

2. Description of Related Art

A motor, also called electric motor, is an energy conversion or transfer electromagnetic apparatus that functions according to the law of electromagnetic. It's main use to generate drive torque, thereby becoming the appliance or a power source of the various mechanical. Because motor operation is developed by solenoid cutting action, and the current resistance of the effect must produce heat, the greater the current, the more heat it generates. In continuous operation, the motor will accumulate a large amount of heat affecting the overall performance of the motor, thereby reducing the efficiency of the motor operation, thereby increasing the running cost of the motor.

To solve the above problem, Chinese Utility Model No. 201290050, discloses a "motor heat dissipating device" on Aug. 12, 2009, it's technical features comprises a motor body, a housing for covering the motor body, a cooling water tank and a pump, said housing is equipped with a water outlet hole and a water inlet hole and with external piping, connects with the cooling water tank to form a circulating loop; the pump is installed in between the cooling water tank and the water inlet hole; the housing seals the motor body, and there is a water holding space in between the housing and the motor body; when the motor is in operation, the pump pumps water from the cooling water tank, and through the water inlet hole, pumps the water into the water holding space and by using the hydro-cooling method, cools the motor body; the water then flows, through the water outlet hole, back the cooling water tank to allow repeated use. The motor heat dissipating device of this invention adapts the hydro-cooling method, pumping cooling water from the cooling water tank to cool off the heat giving off from the motor, and via the cooling water tank to loop cooling water and heat exchange. This method can increase heat dissipation, enhance motor operation efficiency, and thereby reducing the running cost of the motor. However, the structure of this type of water-cooling heat dissipating device is more complicated and subject to set up additional external cooling water loop pipe, when used in combination with other mechanical components is not easy.

In addition, the rotor of the motor is provided with a number of coils, when the motor is operating, the coils give off the most heat, and then the coil of the stator of the motor give off the second most heat. The heat from the rotor may be conducted through air to the motor housing; there is a low thermal conductivity between the rotor and the motor housing, hence, thermal conduction is slow. Whereas, CN201290050 technical solution focuses on heat dissipation on the motor housing, the heat dissipation effect is limited Chinese Patent Publication No. CN2751887Y discloses a heat dissipating device for paper shredder wherein, on one side of the motor a heat dissipating fan is installed and on the other side of the motor several heat dissipating holes are provided. The shortcoming of this invention is that the heat dissipating from the heat dissipating holes still remain in the paper shredder housing, and mixed with the heat dissipating from other components, affecting the cooling efficiency of the motor. Because heat dissipating fan is mounted on one side of the motor while the other side of the motor is mounted with an output shaft, no further fan can be mounted, because the high speed rotation of the output shaft can shake off a fan mounted on it, and to cause mechanical failure. This also constitute a constraint to designers on further increasing the cooling efficiency.

In another prior art, it provides a motor heat dissipating device having the structure: having heat dissipating holes directly on motor housing body. The motor heat dissipating device with this structure although may allow the heat from inside of the motor to dissipate from the dissipating holes, however, this type of heat dissipation is conducted by natural flow of air, hence heat dissipating efficiency is low, and heat is easily accumulated inside the motor. In another type of motor heat dissipating device, the heat dissipating device is arranged around the motor housing body, and allows close fit of the heat dissipating device and the motor housing body, with this structural characteristics, the heat dissipating area and efficiency are increased for the motor heat dissipating device, however, the device may be bulky, requires the motor to occupy more space.

There are other prior arts also provide a number of motor's cooling structures, but their structures are complex and assembly are not easy, and required higher manufacturing costs.

Therefore, with these deficiencies in the prior arts, there is a need to provide a paper shredder, where this paper shredder would have a heat dissipating device for the motor, with great cooling effect, can achieve rapid cooling of the motor, have a long continuous shredding time short motor recovering time long operating life simple structure easy assembly, and with characteristics to facilitate market-oriented promotion and application.

SUMMARY OF THE INVENTION

The objective of present invention is to provide a paper shredder that overcomes the deficiencies in the current paper shredder. The present paper shredder having a heat dissipating device for the motor, with great cooling effect, can achieve rapid cooling of the motor, have a long continuous shredding time short motor recovering time long operating life simple structure easy assembly, and with characteristics to facilitate market-oriented promotion and application.

The objective of present invention can be achieved by the following technical solutions: the paper shredder of present invention comprises a housing and a shredder head. The shredder head is provided with a transmission mechanism and a motor. The motor comprises a motor body. The motor body is provided with an output shaft and a slip-on said output shaft motor housing body. The motor housing body is provided with a heat dissipating device. The heat dissipating device comprises an air intake device and an air output device. The air intake device is provided with cold air inlet holes; said air output device is provided with hot air output holes. The air intake device is mounted on one side of the output shaft; the air output device is mounted on the other side of said output shaft. The motor housing body is mounted on the position aligns to a connecting passage of air intake device to the air inlet hole of the cavity of the motor housing body. The motor housing body is also mounted on the position aligns to a connecting passage of the air output device to the air output hole of the cavity of the motor housing body, to form an isolated, independent from cold air inlet hole, cavity of the motor housing body and cavity of hot air output holes, heat dissipating air channel that runs from cold air inlet hole cavity of the motor housing body to cavity of hot air output holes.

The housing is provided with a heat dissipating device housing body. The heat dissipating device housing body is provided with an air channel interlinked with outside air. The air channel comprises an air inlet channel and an air output channel. The cold air inlet hole of the air intake connects or closes to the air inlet channel. The hot air output hole of the air output device connects to or closes to the output channel, to form an isolated, independent from the housing, heat dissipating air channel that runs from air inlet channel cold air inlet hole cavity of the motor housing body hot air output hole to air output channel.

The air intake device is provided with a fan.

The air intake device is provided with an air intake securing device. The air intake securing device is fixed onto the motor housing body. The side of the air intake securing device having the air inlet holes, is provided with an air inlet channel. The air inlet channel slot connects to air inlet holes and cold air inlet holes.

One side of the air intake securing device is slip onto the motor housing body; several through holes are provided on one side of the motor housing body as air inlet holes; the air inlet channel slot surrounds the outer side of the motor housing body, and air inlet channel slot is opening up on the side that facing the motor housing body.

The outer wall of the air inlet channel slot contacts with the motor housing body.

A sealing gasket is provided in between the outer wall of the air inlet channel slot and the motor housing body.

The air intake securing device comprises a first air intake securing device and a second air intake securing device. The first air intake securing device and the second air intake securing device are tightly connected. The first air intake securing device and the second air intake securing device are all in semi-circular structure.

The cross-section shapes of the first air intake securing device and the second air intake securing device are U shaped.

The air intake device further provided with a fan base and an air inlet cover body. One side the fan base is connected with the air intake securing device. The other side of the fan base is connected with the air inlet cover body. The fan base and the air inlet cover forms an air inlet cavity; the fan is installed inside the air inlet cavity.

The air intake securing device and the fan base are integrated in one device.

The air output device comprises an air output securing device. The air output device securing device is fixed onto the motor housing body. The side of the air output securing device that having the air output holes, is provided with an air output channel slot. The air output channel slot connects the air output holes and the hot air output holes.

The air output securing device comprises a first air output securing device and a second air output securing device. The first air output securing device and the second air output securing device are tightly connected. The first air output securing device and the second air output securing device are all in semi-circular structure.

The cross-section shapes of the first air output securing device and the second air output securing device are U shaped.

The air output device comprises an air output cavity connecting device and an air output cover body. One side of the air output cavity connecting device connects with the air output securing device. The other side of the air output cavity connecting device connects with the air output cover body. The air output cavity connecting device is provided with an air output cavity.

The air output securing device and the air output cavity connecting device are integrated in one body.

The air output device is provided with a fan.

The air output device is provided with an axial fan. The axial fan is fixed onto the tail end of the motor housing body. The first end of the axial fan is closed, and the second of the axial is provided with air inlet holes that parallel with the output shaft. The second end of the axial fan connects with the tail end face of the motor housing body; the air inlet holes connect with the air output holes, as such, also connect to the cavity of the motor housing body.

The air intake device comprises a cylindrical shaped air inlet cover body. The air inlet cover body connects with one end of the motor body. The air inlet holes set on the surface of the air inlet cover body are also used for cold air inlet holes.

The air inlet holes are uniformly set along the circumferential direction of the air inlet cover body.

The air inlet cover body and the motor body are integrated in one body.

The hot air output holes are set on one side of the axial fan.

The air output device further comprises screws. The axial fan is provided with securing holes. One side of the motor housing body is provided with threaded holes. The screws pass through the securing holes and the threaded holes and secured the axial fan on one of the motor housing body.

On one side of the axial fan is provided with an air guiding duct. The air guiding duct is perpendicular to the output shaft and is used for outputting airflow. The air guiding duct is funnel-shaped and the wider cross-section is set facing outward.

The above-described motor of the present invention, compared with prior arts, the air intake device to suck outside air through cold air inlet hole into the motor body and to allow air cooling of rotor, coil and other components. Then, air output device outputs hot air from the housing through hot air output holes to outside of the housing. The cold air inflow from outside into the cavity of the motor housing conducts heat exchange with the motor coil and the motor housing body, and rapidly cooling coil and the motor housing body. The air intake device and air output device are equipped with fan to conduct force air cooling, in this way, allows faster airflow, rapid cooling of the motor, and as a result, prolong the life of the motor.

With this structural characteristic that within the motor, forms an isolated and independent, from the cavity of the motor body housing, heat dissipating air channel, that runs from cold air inlet holes through the cavity of motor body housing to hot air output holes. In paper shredder main body, the cold air inlet holes of the air intake device connect or close to the air inlet channel; the hot air output holes of the air output device connect or close to the air output channel, to form an isolated and independent, from the cavity of the housing, a heat dissipating air channel, that runs from cold air inlet holes, cavity of the motor housing body, hot air output holes to air output channel. With this structural setting, hot air does not mix with other hot air generated from other components in the cavity of the housing, and is directly discharged into outside air. As such, increase heat dissipating efficiency. Furthermore, as the air intake device and air output device are mounted on the side; the mounting designs are not constrained by the motor output shaft, with simple structural design, and overall motor size is relatively small, the present invention of paper shredder can be easily assembled, and more readily available for market-oriented promotion and application.

DETAILED DESCRIPTION OF PREFERRED EMBODIMENT

Preferred Embodiment 1

Figure 1:
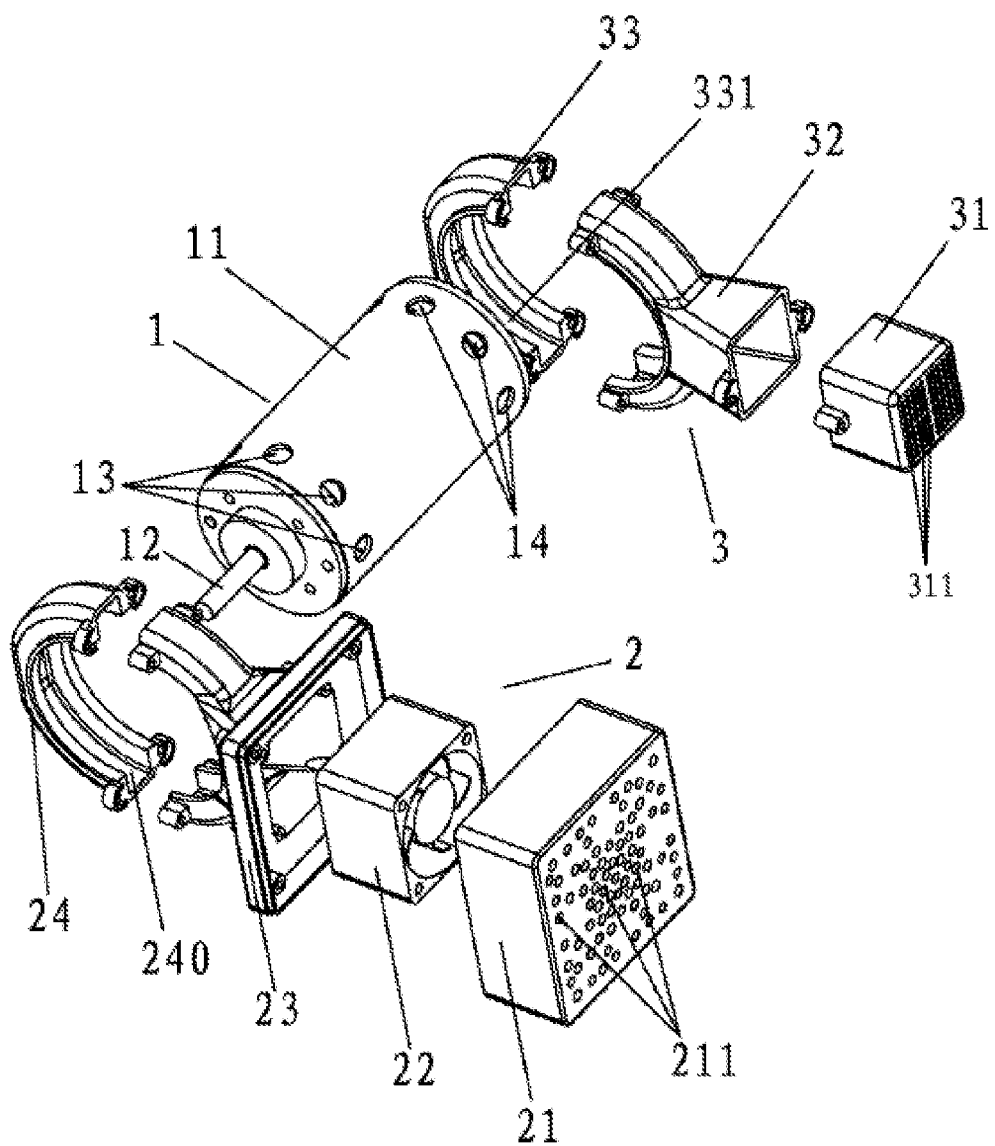
FIG. 1 is a structural illustration of the motor as described in Preferred Embodiment 1.

As shown in FIG. 1, the motor comprises a motor body 1, the motor body 1 is provided with an output shaft 12 and a motor housing body 11 that slips onto the output shaft 12, in which, the motor housing body 11 is provided with a heat dissipating device. The heat dissipating device comprises an air intake device 2 and an air output device 3. The air intake device 2 is mounted close to one side of the output shaft 12. The air output device 3 is mounted a distance from one side of the output shaft 12. The motor housing body 11 is provided with air inlet holes 13 on the position corresponding to the air intake device 2. The motor housing body 11 is also provided with air output holes 14 on the position corresponding to the air output device 3. The air intake device 2 is provided with a fan 22. The air inlet holes provided on the motor housing body 11 are arranged in a circular fashion, and the space between each of the air inlet hole 13 is equal. The air output holes provided on the motor housing body 11 are arranged in a circular fashion, and the space between each of the air output hole 14 is equal. The motor having the heat dissipating device sucks in outside air with the fan 22 of the air intake device 2 into the motor housing body 11 through the air inlet holes 13. The fan 22 inducts force air cooling to the motor body 1 components, such as rotor, coil and etc. Then the air output device 3 discharges hot air into outside air through the air output holes 14 of the motor housing body 11. Because the fan 22 inducts force air cooling, which allows rapid airflows, greatly increase the cooling effect of the motor, as a result, the life of motor is prolonged. Furthermore, with simple structural design, the device can be easily assembled, and more readily available for market-oriented promotion and application.

In addition, the mounting arrangement of the air intake device and air output device 3 on the motor housing body 11 can be such that: the air intake device 2 is mounted away from one side of the output shaft 12, and the air output device 3 is mounted close to one side of the output shaft 12.

Wherein, the fan 22 can be axial fan or blower fan.

Figure 2:
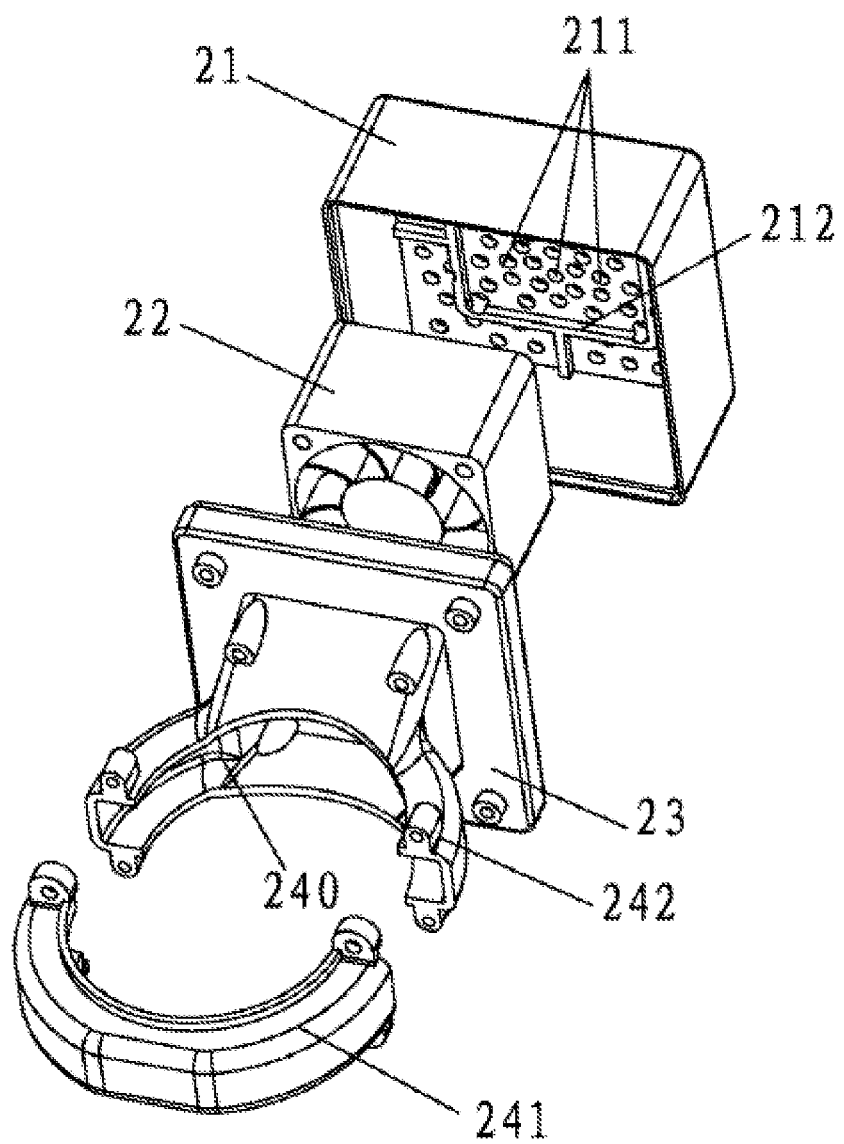
FIG. 2 is a structural illustration of air intake device of the motor as described in Preferred Embodiment 1.

As shown in FIG. 2, air intake device 2 is further provided with an air intake securing device 24, a fan base 23 and an air inlet cover body 21. The air intake securing device 24 is mounted on the motor housing body 11, and more specifically, a portion of the air intake securing device 24 is sleeved on the motor housing body 11. The air inlet holes 13 are arranged on the sides of the motor housing body 11. The air inlet channel slot 240 surrounds the outer rim of the motor housing body 11. The side of the air inlet channel slot 240 facing the motor housing body 11 has an open face; the outer wall of the air inlet channel slot 240 is tightly attached to the motor housing body 11 and a sealing gasket (not shown in the drawings) is provided between the outer wall of the air inlet channel slot 240 and the motor housing body 44. One side of the fan base 23 is connected with air intake securing device 24. The other side of the fan base 23 is connected with air inlet cover body 21. An air inlet cavity is formed between the fan base 23 and air inlet cover body 21. A slot 212 is provided inside the air inlet cover body 21 for securing the fan 22. The fan 22 is set on the slot 212 and by using screws on the four corner of the fan 22, the fan 22 is tightly secured on fan base 23. As such, that fan 22 is position inside the air inlet cavity. An air inlet channel slot 240 is provided on the side of the air intake securing device 24 with air inlet holes 13. The outer surface of the air inlet cover body 21 is provided with air intake holes 211. The air inlet channel slot 240 connected through air inlet holes 13 and air intake holes 211. The outside air is sucked by the fan 22 of the air intake device 2, and through the air intake holes 21 of the air inlet cover body 21, into the air inlet cavity. The sucked-in air, through the annular shaped air inlet channel slot 240, forms a cyclone around the air inlet holes 13 to conduct flow cooling. The sucked-in air then enter through the air inlet holes 13 into the motor for cooling.

As shown in FIGS. 1 and 2, the air intake holes 211 can be uniformly or unevenly arranged on outer surface of the air inlet cover body 21. The aperture of the air intake holes 211 should not be too great, as such to prevent dust from entering through or user's finger being accidentally caught on. The size of aperture of the air intake holes 211 is optimally set between 50 mm.about.300 mm.

As shown in FIG. 2, the air intake securing device 24 comprises a first air intake securing device 241 and a second air intake securing device 242. The first air intake device securing device 241 and the second air intake securing device 242 are tightly connected. The first air intake securing device 241 and the second air intake device securing device 242 are semi-circular shaped. The cross-cut section of the first air intake securing device 241 and the second air intake device securing device 242 are U-shaped. Wherein, the air inlet channel slot 240 is an U-shaped slot. The first and second air intake securing device 241, 242 are tighten together by screws. The tighten piece is then clamped onto the motor housing body 11. As such, the air inlet channel slot 240 is closely attached to the air inlet holes 13. Wherein, the second air intake securing device 24 connects with the fan base 23.

As shown in FIG. 1, the air intake securing device 24 and the fan base 23 can be designed to be integrated into one piece or can be tightly fasten together by using screws.

Figure 3:
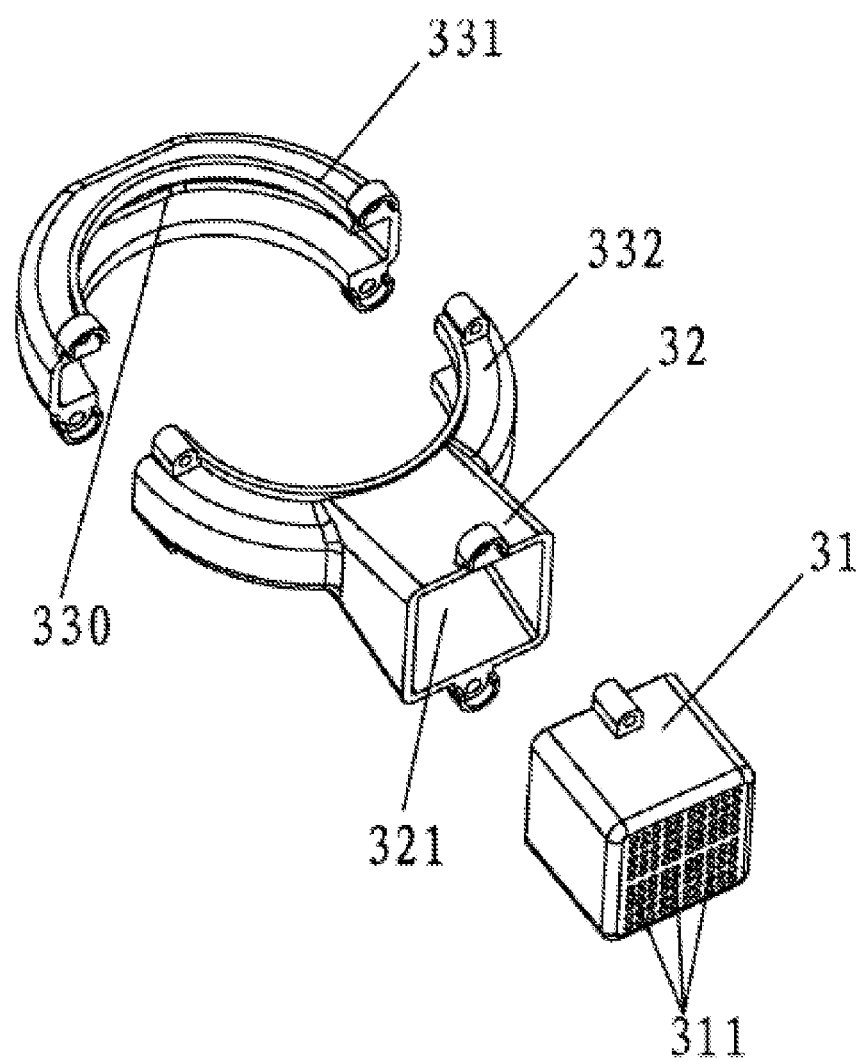
FIG. 3 is a structural illustration of air output device of the motor as described in Preferred Embodiment 1.

As shown in FIG. 3, the air output device 3 comprises an air output securing device 33 an air output cavity connecting device 32 and an air output cover body 31. The air output device securing device 33 is secured on the motor housing body 11. One side of the air output cavity connecting device 32 connects with the air output securing device 33. One side of the air output cavity connecting device 32 connects with the air output cover body 31 and is secured with screws. The air output cavity connecting device 32 is provided with air output cavity 321. The air output securing device 33 is mounted on the side of the air output holes 14 with the air output channel slot 330; the air outlet channel slot 330 connects with the air output cavity 321. The outer surface of the air output cover body is provided with air outlet holes 311. The hot air flows through the air output holes 14 of the motor housing body 11 and enters the air output channel slot 330 of the air output device 3 to conduct cyclone flow. The hot air then, passes through air output cavity 321 and then air outlet holes 311 discharged into outside air. Wherein, the air output cavity 321 has a diverging type structure; with the larger side of the air output cavity 321 connects with the air output cover body 31. Provided with air pressure, discharge the air from the air output channel slot 330 into outside air. In this motor, the air intake holes 211 are used for cold air inlet holes, the air outlet holes 311 are used for hot air output holes. In this way, to form an isolated, and independent from the motor housing body, heat dissipating air channel from the cold air inlet holes through the cavity of the motor housing body to the hot air output holes, that does not be affected by the heat generated from other motor components.

As shown in FIGS. 1 and 3, the air outlet holes 311 can be uniformly or unevenly arranged on outer surface of the air output cover body 31. The aperture of the air outlet holes 311 should not be too great, as such to prevent dust from entering through or user's finger being accidentally caught on. The size of aperture of the air outlet holes 311 is optimally set between 50 mm.about.300 mm.

As shown in FIG. 3, the air output securing device 33 comprises a first air output securing device 331 and a second air output securing device 332, the first air output securing device 331 and the second air output securing device 332 are tightly connected. The first air output securing device 331 and second air output securing device 332 are semi-circular shaped. The cross-section cut of the first air output securing device 331 and the second air output securing device 332 are U shaped. Wherein, the air output channel slot 330 is a U shaped slot. The two U shaped structure of the air output securing devices 33 are tighten together by screws. The tighten piece is then clamped onto the motor housing body 11. As such, the air output channel slot 330 is closely attached to the air output holes 14. Wherein, the second air output securing device 332 connects with the air outlet cavity connecting device 32.

As shown in FIG. 1, the air output securing device 33 and the air output cavity connecting device 32 can be designed to be integrated into one piece or can be tightly fasten together by using screws.

Figure 4:
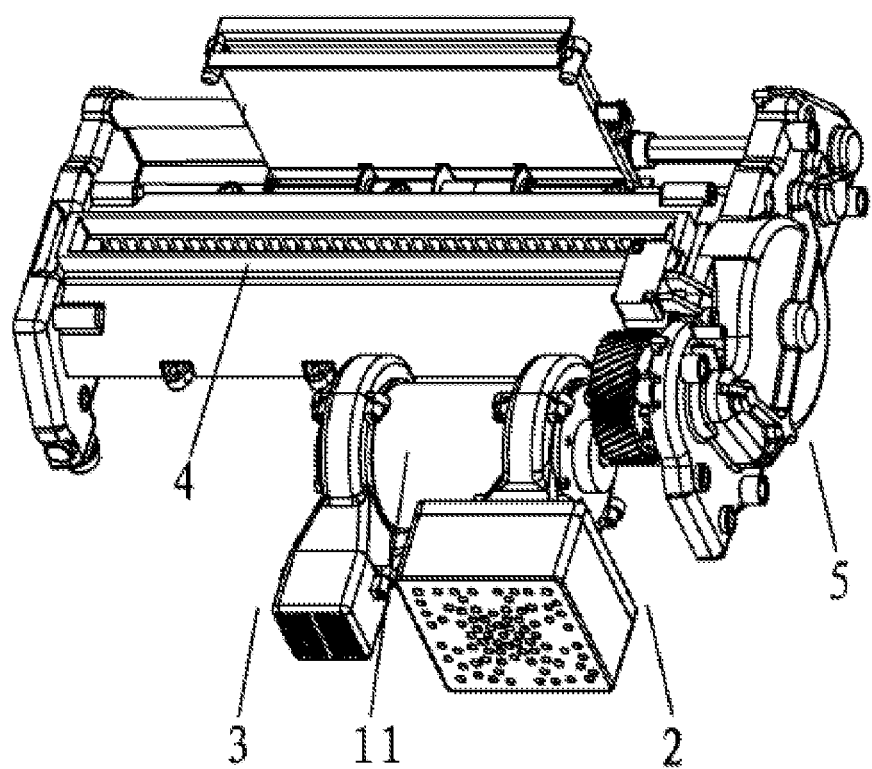
FIG. 4 is an internal structural illustration of the paper shredder as described in Preferred Embodiment 1.
Figure 5:
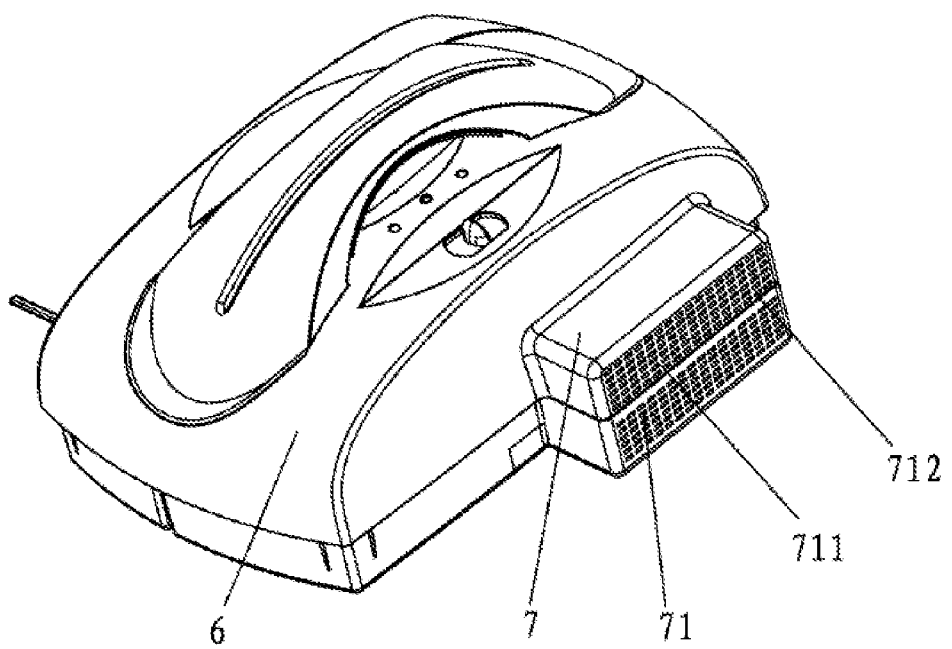
FIG. 5 is an external structural illustration of the paper shredder as described in Preferred Embodiment 1.

As shown in FIGS. 4 and 5, the paper shredder having the above-described motor comprises a housing 6 and a shredder head 4. The shredder head 4 is provided with a transmission mechanism 5 and the motor. The housing 6 is provided with a heat dissipating device housing body 7. The heat dissipating device housing body 7 is provided with an air channel 71 that connects to outside air. The air channel 71 comprises an air inlet channel 711 and an air output channel 712. The air inlet holes of the air intake device connects or close to the air inlet channel 711; the hot air output holes of the air output device connects or close to the air output channel 712, to form an isolated and independent, from the cavity of the housing 6, heat dissipating air channel, that runs from the air inlet channel 711, cold air inlet holes, cavity of the motor housing body, hot air output holes to air output channel 712.

Preferred Embodiment 2

Figure 6:
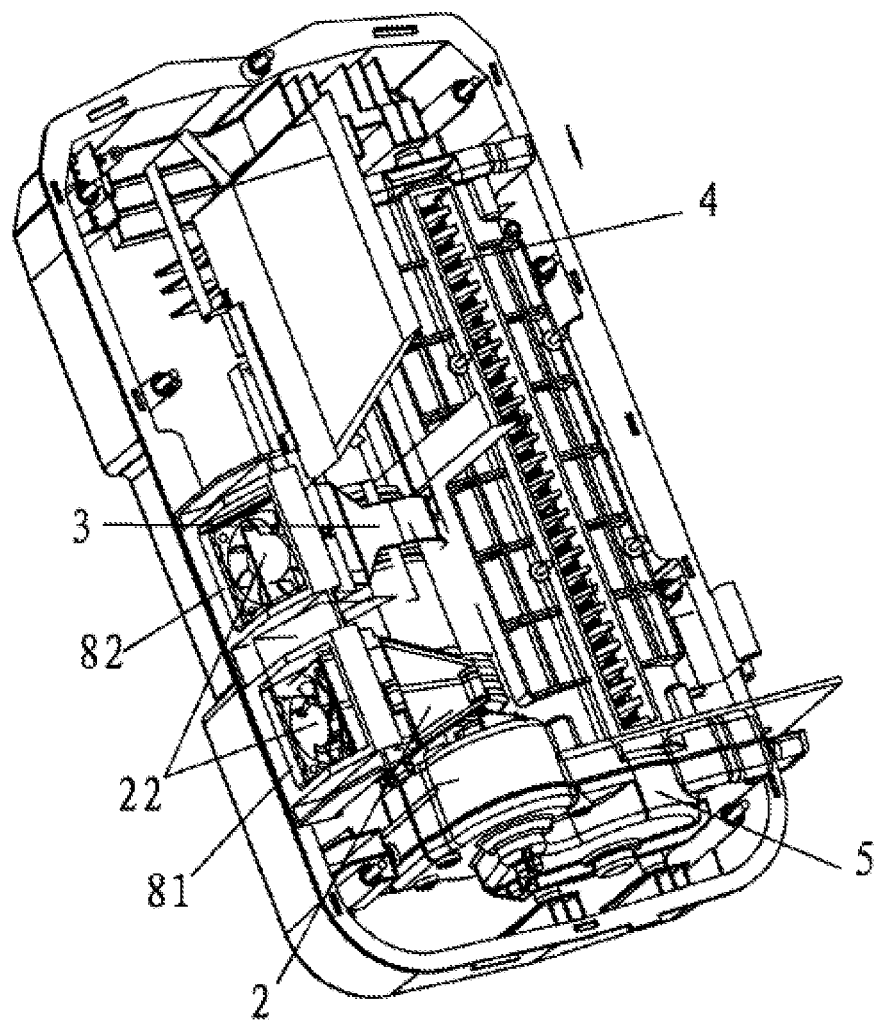
FIG. 6 an internal structural illustration of the motorized paper shredder as described in Preferred Embodiment 2.

As shown in FIG. 6, the paper shredder of the present invention comprises a housing 6 and a shredder head 4. The shredder head 4 is provided with a transmission mechanism 5 and a motor. The motor is similar to the one described in Preferred Embodiment 1, for which comprises a motor body. The motor body is provided with an output shaft that sleeves on the motor housing body 11. The motor housing body 11 is provided with a heat dissipating device. The heat dissipating device comprises an air intake device 2 and an air output device 3. The air intake device 2 is provided with cold air inlet holes 81. The air output device 3 is provided with hot air output holes 82. The air intake device 2 is mounted on one side of the output shaft. The air output device 3 is mounted on the other side of the output shaft. The motor housing body 11 is provided with air inlet holes on the position corresponding to the air intake device 2 and are connected through the cavity of the motor housing body. The motor housing body 11 is also provided with air output holes on the position corresponding to the air output device 3 and are connected the cavity of the motor housing body 11. In this Preferred Embodiment, the air intake device 2 is provided with a fan 22. Differ from the Preferred Embodiment 1, the air output device 3 is also provided with a fan 22, to allow forced air cooling and increased rapid airflow, as such motor can be cooled rapidly, prolong the life of the motor.

Figure 7:
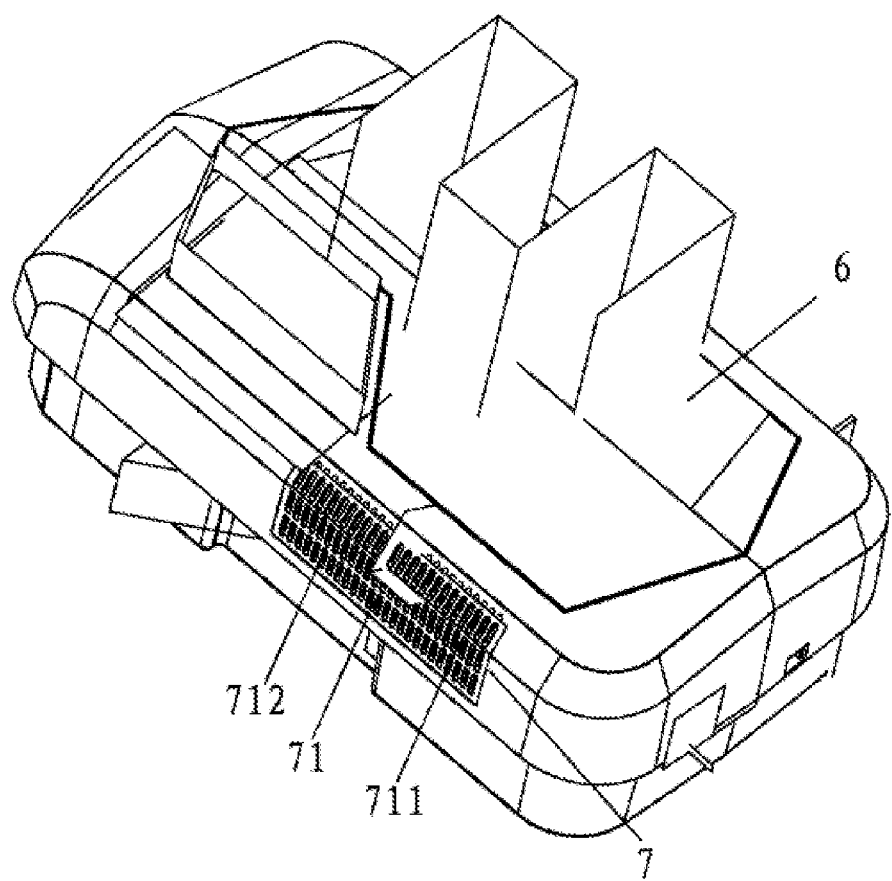
FIG. 7 an external structural illustration of the motorized paper shredder as described in Preferred Embodiment 2.

As shown in FIG. 7 of the paper shredder of the present invention. Similar to Preferred Embodiment 1, the housing 6 is provided with a heat dissipating device housing body 7. The heat dissipating device housing body 7 is provided with air channel 71 that connects to the outside air. The air channel comprises an air inlet channel 711 and an air output channel 712. The cold air inlet holes 81 of the air intake device 2 connects or close to the air inlet channel; the hot air output holes 82 of the air output device 3 connects or close to output channel, to form an isolated and independent, from the cavity of the housing 6, a heat dissipating air channel, that runs from air inlet channel 711, cold air inlet holes 81, cavity of the motor housing body, hot air output holes to air output channel 712.

Preferred Embodiment 3

Figure 8:
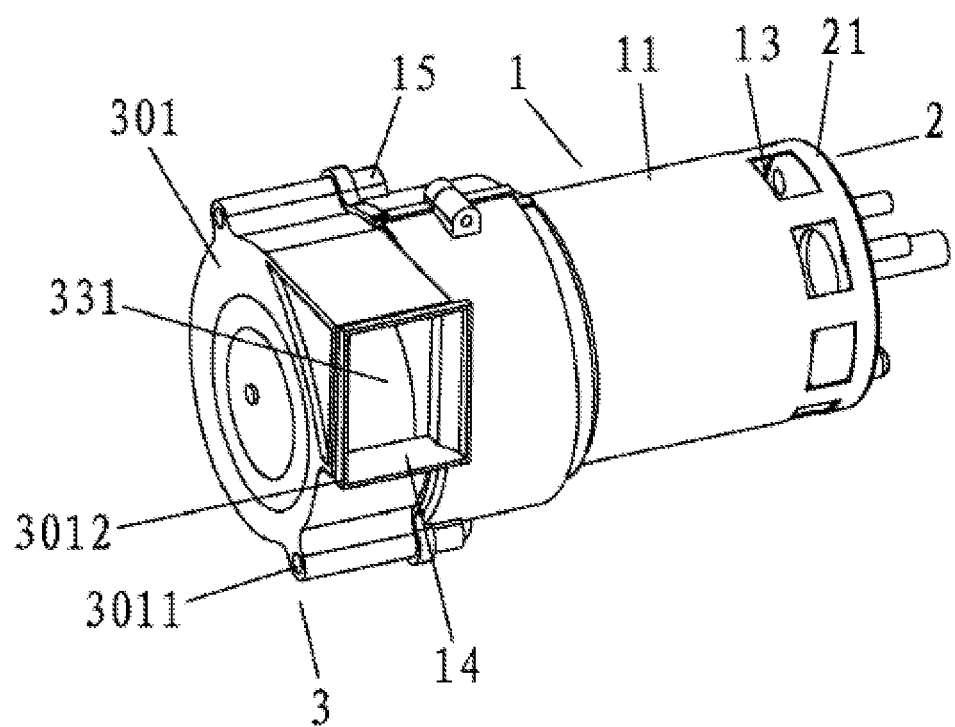
FIG. 8 is a structural illustration of the motor as described in Preferred Embodiment 3.
Figure 9:
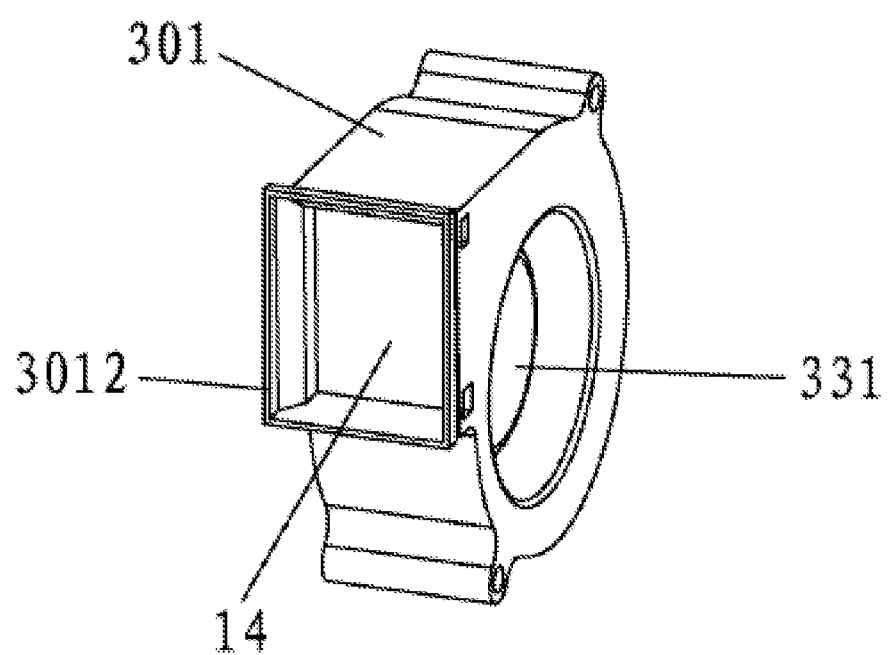
FIG. 9 is a structural illustration of air output device of the motor described in Preferred Embodiment 3.

As shown in FIGS. 8 and 9, the motor comprises a motor body 1. The motor body 1 is provided with an output shaft and a motor housing body 11 that sleeves onto the output shaft. The motor housing body 11 is provided with a heat dissipating device. The heat dissipating device comprises an air intake device 2 and an air output device 3. The air intake device 2 is mounted on one side of the output shaft; the air output device 3 is mounted on the other side of the output shaft. The air intake device 2 is provided with air inlet hole 13 (can also be used as cold air inlet hole). The air output device 3 is provided with hot air output hole 14. The air output device 3 is also provided with a axial fan 301. The axial fan 301 is mounted on the tail end of the motor housing body 11. The first end of the axial fan 301 is closed and the second end of the axial fan 301 is provided with air inlet holes 331 that parallel with the output shaft. The second end of the axial fan 301 connects with the face of tail end of the motor housing body 11. The air inlet holes 331 connects with the air output holes in the cavity of the motor housing body, as such, also connected through the cavity of the motor housing body 11. The axial fan 301 is also called centrifugal fan. When the axial fan 301 is operating, the axial fan 301 sucks in outside air from the air inlet hole 13 into the motor housing body 11. The air is then discharged into outside air through hot air outlet holes 14. Therefore, with the operation of axial fan 301 there forms an airflow loop inside of the motor housing body 11 that provides the cooling effect.

The air intake device 2 comprises a cylindrical shaped air inlet cover body 21.

One side of the air inlet cover body 21 and motor body 1 are connected and secured together. The air inlet holes 13 are provided on the surface of the air inlet cover body 21. When the axial fan 3 is operating, outside air is sucked in from the air inlet holes 13 into the motor housing body 11. In this motor, the air inlet holes 13 are used as cold air inlet holes, to form an isolated and independent, from cavity of the motor housing body, a heat dissipating air channel, that runs from cold air inlet holes, cavity of the motor housing body to the hot air output holes.

The air inlet holes 13 are uniformly arranged along the circumferential direction of the air inlet cover body 21. When the axial fan 3 is operating, outside air is sucked in through the air inlet cover body 21 into the motor housing body 1.

The air inlet cover body 21 and motor body 1 are integrated in one body.

The hot air output holes 14 are provided on one side of the axial fan 301. When the axial fan 301 is operating, outside air is sucked through the air inlet holes 13 into the motor housing body 1, then discharged into outside air through hot air output holes 14. The axial fan 301 further comprises screws (not showing in the drawings). The axial fan 301 is provided with securing holes 3011. The one side of the motor housing body 1 is provided with threaded hole 15. As such, the screws pass through securing holes 3011 to the threaded holes 15 and secure axial fan 301 on one side of the motor housing body.

One side of the axial fan 301 is provided with an air guiding duct 3012 that perpendicular to the output shaft for discharging airflow. The air guiding duct 3012 is funnel shaped and the wider cross-section side is facing outward.

Figure 10:
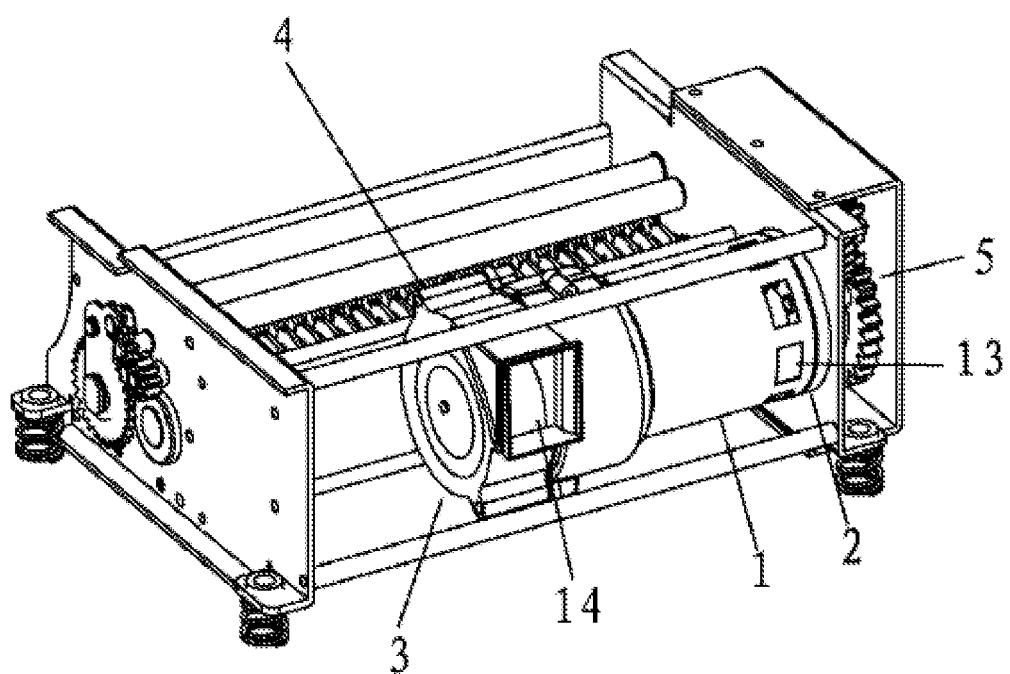
FIG. 10 is an internal structural illustration of the paper shredder as described in Preferred Embodiment 3.
Figure 11:
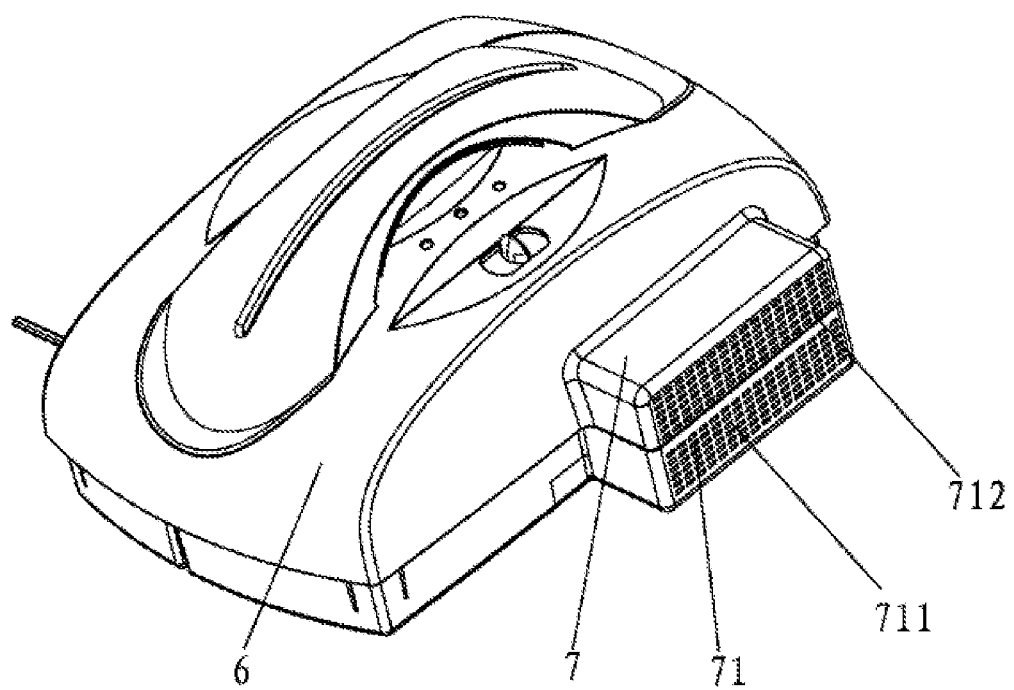
FIG. 11 is an external structural illustration of the paper shredder as described in Preferred Embodiment 3.

As shown in FIGS. 10 and 11 the paper shredder having the above-described motor comprises a housing 6 and a shredder head 4. The shredder head 4 is provided with a transmission mechanism 5 and the above-described motor. The housing 6 is provided with a heat dissipating device housing body 7. The heat dissipating device housing body 7 is provided with an air channel 71 that connects to the outside air. The air channel 71 comprises an air inlet channel 711 and an air output channel 712. The cold air inlet holes of the air intake device connect with or close to air inlet channel 711; the hot air output hole 14 of the air output device connect with or close to air output channel 712, to form an isolated and independent, from cavity of the housing 6, heat dissipating air channel, that runs from air inlet channel 711, cold air inlet holes, cavity of motor housing body, hot air output holes to air output channel 712.

The above are only the preferred embodiments of the present application, in the equivalent technical solutions based on these shall fall within the scope of protection of this invention.

INDUSTRIAL APPLICATION

Present invention of paper shredder adapts an air intake device to suck in outside air through cold air inlet holes into motor body to be used for cooling various motor components, such as rotor and coils. Then, present invention of paper shredder adapts an air output device to discharge hot air in the housing through hot air output holes into outside air. The inflow of outside air into cavity of the motor housing body conducts heat exchange with the motor coils and the motor housing body, rapidly takes away the heat generated from coil and the motor housing body and bring down the temperature. The air intake device or the air output device adapt a fan to conduct forced air cooling, as such to increase airflow, and rapid cooling of the motor, as a result, prolong the life of the motor. Within the motor, an isolated and independent, from the cold air inlet hole, motor housing body to hot air output holes, heat dissipating channel is formed. In the present paper shredder, the cold air inlet holes of the air intake device connect with or close to air inlet channel, and the hot air output holes of the air output device connect with or close to air output channel, to form an isolated and independent, from the cavity of the housing, heat dissipating channel, that runs from air inlet channel, cold air inlet holes, cavity of motor housing to hot air output holes. The hot air discharged does not come to mix with the hot air generated from other components in the cavity of the housing; the hot air is directly discharged into outside air that greatly increases the cooling efficiency. Because the air intake device and air output device is mounted on the side of output shaft, the mounting design is not restraint by the output shaft, a simpler structure design can be achieved. With relatively small motor size and easy assembly characteristic, the present paper shredder can be more readily available for market-oriented promotion and application.

The invention claimed is:

1. A paper shredder comprising:
a shredder head;
a transmission mechanism provided for said shredder head;
a motor provided for said shredder head, said motor comprising:
a motor body comprising:
an output shaft; and
a motor housing body sleeved on said output shaft, said motor housing body having a cavity, a plurality of air inlet holes positioned on one side of the said output shaft and communicated with said cavity and a plurality of air outlet holes positioned on the other side of said output shaft and communicated with said cavity, said plurality of air inlet holes and said a plurality of air outlet holes being formed as through holes in said motor housing body;
a heat dissipating device provided for said motor housing body, said heat dissipating device comprising:
an air intake device mounted on said motor housing body on said one side of said output shaft, said air intake device having a plurality of cold air inlet holes corresponding to said plurality of air inlet holes, said air intake device comprising:
an air intake securing device sleeved onto and secured on said motor housing body, said air intake securing device having an air inlet channel slot, said air inlet channel slot surrounding an outer rim of said motor housing body and communicating said plurality of air inlet holes and said plurality of cold air inlet holes, said air inlet channel slot having an open side facing said motor housing body; and an inlet fan operated independent of said motor, said inlet fan being located near said plurality of air inlet holes, said air inlet channel slot and said plurality of cold air inlet holes;

an air output device mounted on said motor housing body on said the other side of said output shaft, said air output device having a plurality of hot air outlet holes corresponding to said plurality of air outlet holes, said air output device comprising:

an air output securing device sleeved onto and secured on said motor housing body, said air output securing device having an air outlet channel slot, said air outlet channel slot surrounding an outer rim of said motor housing body and communicating said plurality of air outlet holes and said plurality of hot air outlet holes, said air outlet channel slot having an open side facing said motor housing body; and an outlet fan operated independent of said motor, said outlet fan being located near said plurality of air outlet holes, said air outlet channel slot and said plurality of hot air outlet holes; and an isolated and independent heat dissipating air channel formed from said plurality of cold air inlet holes through said air inlet channel slot, said plurality of air inlet holes, said cavity, said plurality of air outlet holes and said air outlet channel slot to said plurality of hot air output holes.

2. The paper shredder as claimed in claim 1 further comprising:

a housing having a heat dissipating device housing body, said heat dissipating device housing body having an air channel that connects with outside air, said air channel comprising an air inlet channel and an air outlet channel, said plurality of cold air inlet holes being connected with or close to said air inlet channel, said plurality of hot air outlet holes being connected with or close to said air output channel; and an additional portion of said isolated and independent heat dissipating air channel formed from said air inlet channel to said plurality of cold air inlet holes and from said plurality of hot air outlet holes to said air outlet channel.

3. The paper shredder as claimed in claim 1 wherein, an outer wall of said air inlet channel slot and an outer wall of said air outlet channel slot are attached to said motor housing body.

4. The paper shredder as claimed in claim 1 wherein, said air intake securing device comprises a first air intake securing device and a second air intake securing device; said first air intake securing device and said second air intake securing device are tightly connected with each other; and said first and second air intake securing device are semi-circular shaped.

5. The paper shredder as claimed in claim 4 wherein, the cross-section of said first and second air intake securing device are U-shaped.

6. The paper shredder as claimed in claim 1 wherein, said air intake device further comprises:

an air inlet cover body;

an inlet fan base having one side connected with said air intake securing device and the other side connected with said air inlet cover body; and an air inlet cavity formed in between said inlet fan base and said air inlet cover body, said inlet fan being installed inside said air inlet cavity.

7. The paper shredder as claimed in claim 6 wherein, said air intake securing device and said inlet fan base are integrated into one piece.

8. The paper shredder as claimed in claim 1 wherein, said air output securing device comprises a first air output securing device and a second air output securing device; said first air output securing device and said second air output device securing device are tightly connected with each other; and said first and second air output securing are semi-circular shaped.

9. The paper shredder as claimed in claim 8 wherein, the cross-section of said first and second air output securing device are U-shaped.

10. The paper shredder as claimed in claim 1 wherein, said air output device further comprises:

an air outlet cover body;

an outlet fan base having one side connected with said air output securing device and the other side connected with said air outlet cover body; and an air outlet cavity formed in between said outlet fan base and said air outlet cover body, said outlet fan being installed inside said air outlet cavity.

11. The paper shredder as claimed in claim 10 wherein, said air output securing device and said outlet fan base are integrated into one piece.

* * * * *